United States Patent [19]

Kanamori

[11] Patent Number: 4,494,326
[45] Date of Patent: Jan. 22, 1985

[54] ELECTROLUMISCENT DISPLAY STRUCTURE FOR MOTOR VEHICLE WINDOW

[75] Inventor: Hiroshi Kanamori, Yokohama, Japan

[73] Assignee: Nissan Motor Company, Limited, Yokohama, Japan

[21] Appl. No.: 402,764

[22] Filed: Jul. 28, 1982

[30] Foreign Application Priority Data

Sep. 29, 1981 [JP] Japan ............... 56-152968

[51] Int. Cl.³ .................................. G09F 13/00
[52] U.S. Cl. ........................... 40/593; 40/544;
                                  40/570; 315/87; 362/84
[58] Field of Search ............ 40/544, 615, 593, 591,
                                       40/615; 362/84; 315/87

[56] References Cited

U.S. PATENT DOCUMENTS

| | | | |
|---|---|---|---|
| 1,419,093 | 6/1922 | Zepka | 40/593 |
| 1,856,519 | 5/1932 | Spears | 40/593 |
| 2,130,090 | 9/1938 | Imhofe | 40/591 |
| 2,557,402 | 6/1951 | Altheimer | 40/615 |
| 2,721,808 | 10/1955 | Roberts et al. | 40/544 |
| 2,858,632 | 11/1958 | Caserio | 40/544 |
| 3,004,359 | 10/1961 | Pisciotta | 40/152.2 |
| 3,083,317 | 3/1963 | Fish et al. | 40/544 |
| 3,125,741 | 3/1964 | Kenneally | 40/544 |
| 3,246,204 | 4/1966 | Katona | 40/544 |
| 3,680,237 | 8/1972 | Finnerty et al. | 40/544 |
| 4,070,781 | 1/1978 | Sauer | 40/591 |
| 4,240,220 | 12/1980 | Smith | 40/564 |
| 4,258,492 | 3/1981 | Williams | 40/593 |

FOREIGN PATENT DOCUMENTS 813060  5/1959  United Kingdom ............... 40/593

Primary Examiner—Gene Mancene
Assistant Examiner—Wenceslao J. Contreras
Attorney, Agent, or Firm—Schwartz, Jeffery, Schwaab, Mack, Blumenthal & Koch

[57] ABSTRACT

In a marking display structure for a motor vehicle window, a means is provided which is arranged to illuminate, from inside, a marking display element so that the marking, which represent the type, model or the like of the motor vehicle, can be recognized not only during day time but also at night.

13 Claims, 8 Drawing Figures

FIG. 2
FIG. 4
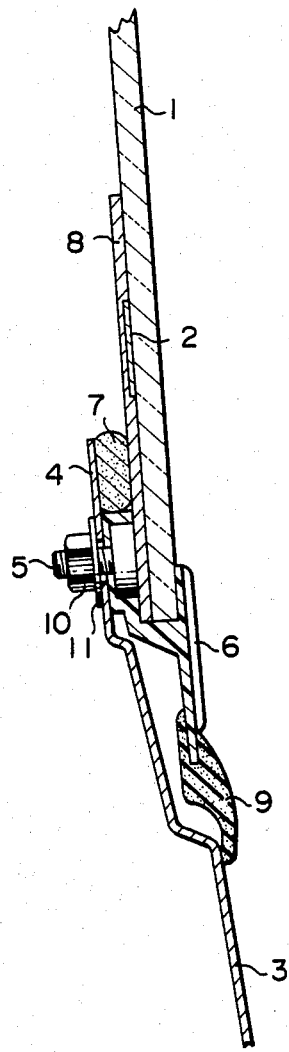
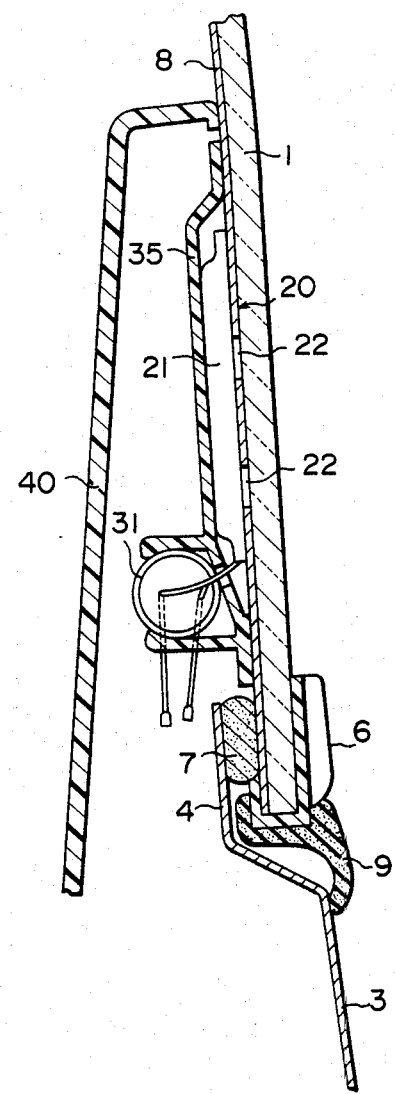

FIG. 7
FIG. 8
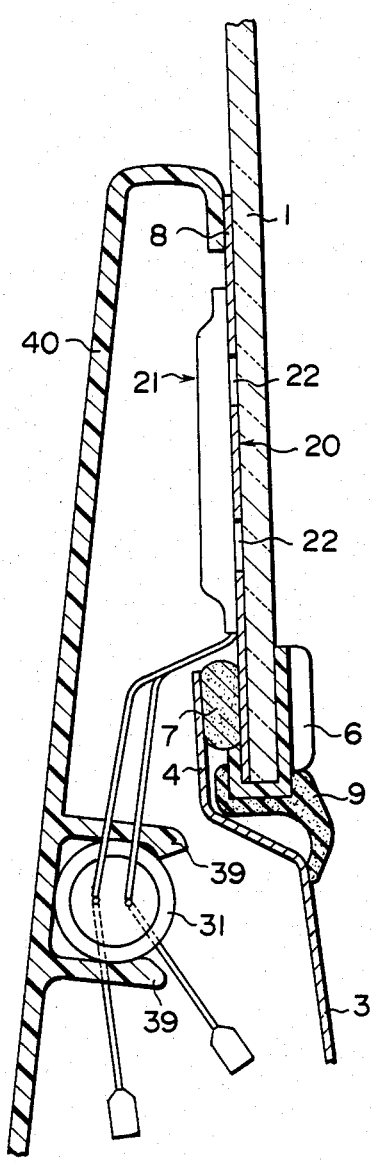
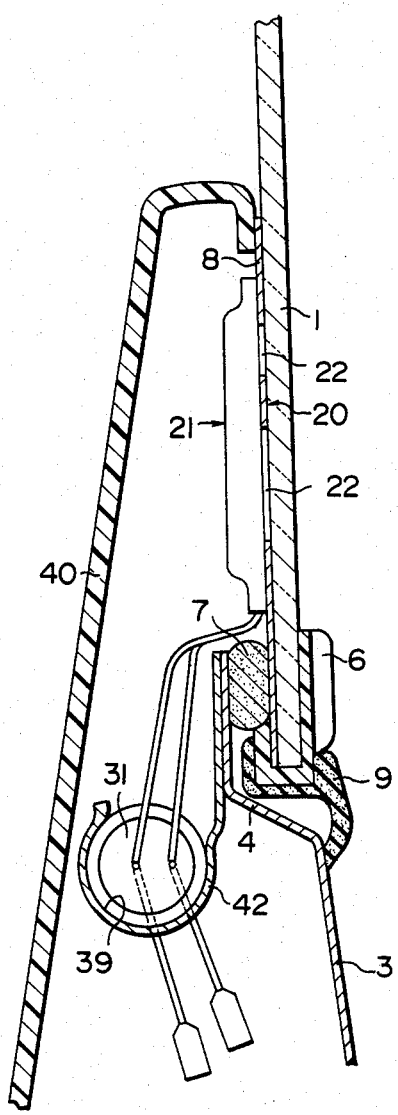

ELECTROLUMISCENT DISPLAY STRUCTURE FOR MOTOR VEHICLE WINDOW

BACKGROUND OF THE INVENTION

1. Field of the Invention

This invention relates to improvements in or relating to a marking display structure for a window such as, for example, rear quarter window of a motor vehicle, the marking display structure being arranged to produce a display representing the type, model or the like of the motor vehicle.

2. Description of the Prior Art

There has conventionally been proposed a marking display structure such as shown in FIG. 1, wherein a marking 2 representing the type, model or the like of a motor vehicle is provided on part of a glass membrane for a rear quarter window of the motor vehicle.

In such a conventional structure, as shown in FIGS. 1 and 2, the rear quarter window glass membrane 1 is securely supported by a peripheral molding 6 which is fastened by screw 5 to a flange 4 of rear pillar outer panel 3. The rear quarter window glass membrane 1 is also bonded to the rear pillar outer panel flange 4 by a bonding agent 7. To hide the screw 5 and bonding agent 7 a black masking paint coating film 8 is applied to the periphery of the inner side of the rear quarter window glass membrane 1. The marking 2 is printed on the inner side of the lower portion of the window glass 1 before the masking coating 8 is applied. In FIG. 2, a seal rubber 9 is provided for sealing the gap between the peripheral molding 6 and the rear pillar outer panel 3, and a nut 10 and a spring washer 11 are employed for tightening the screw 5.

However, the aforementioned conventional structure is disadvantageous in that the marking 2 can be recognized only during day time, that is, it cannot be recognized at night since the structure is arranged such that the marking is viewed with external light.

SUMMARY OF THE INVENTION

Accordingly, it is an object of the present invention to provide a novel and improved marking display structure for a motor vehicle window, which is so designed as to overcome the foregoing drawbacks of the prior-art structure.

Briefly, according to an aspect of the present invention, there is provided a marking display structure for a motor vehicle window which includes means for illuminating, from inside, a marking display unit so that the marking, which represents the type, model or the like of the motor vehicle, can be recognized not only during day time but also at night.

Other objects, features and advantages of the present invention will become apparent from the ensuing description taken in conjunction with the accompanying drawings.

BRIEF DESCRIPTION OF THE DRAWINGS

FIG. 2 is a sectional view taken along the line II—II of FIG. 1.

FIG. 4 is a sectional view taken along the line IV—IV of FIG. 3.

FIGS. 7 and 8 are sectional views showing modifications to means according top the present invention for holding a DC-AC converter which may be provided for energizing the luminescent lamp, respectively.

DESCRIPTION OF PREFERRED EMBODIMENTS

Figure 1:
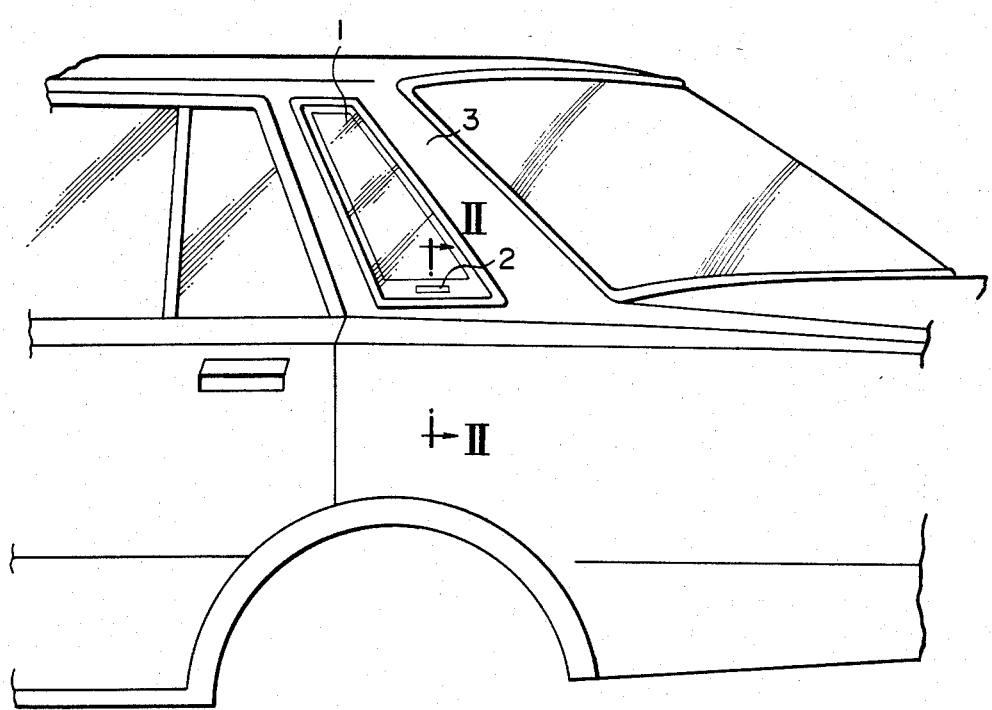
FIG. 1 is a perspective view showing an example of the conventional marking display structure for a motor vehicle window.
Figure 3:
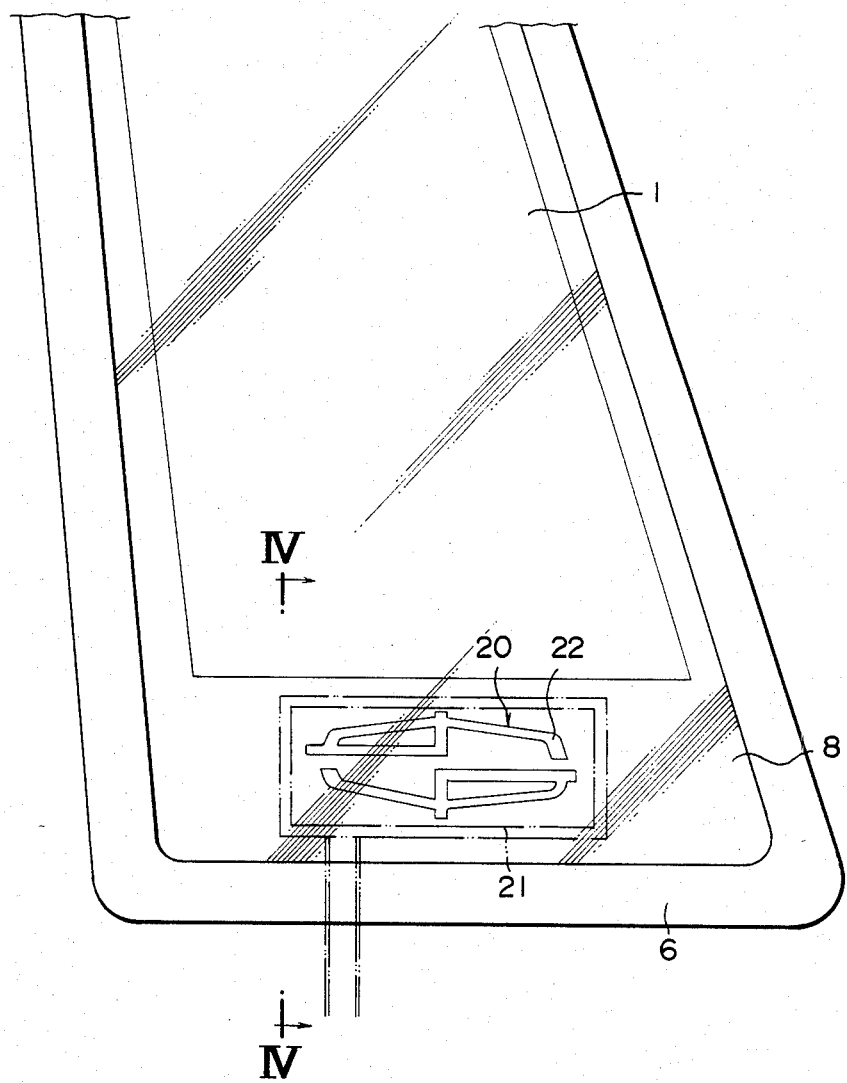
FIG. 3 is a perspective view illustrating the marking display structure for a motor vehicle according to an embodiment of the present invention.
Figure 5:
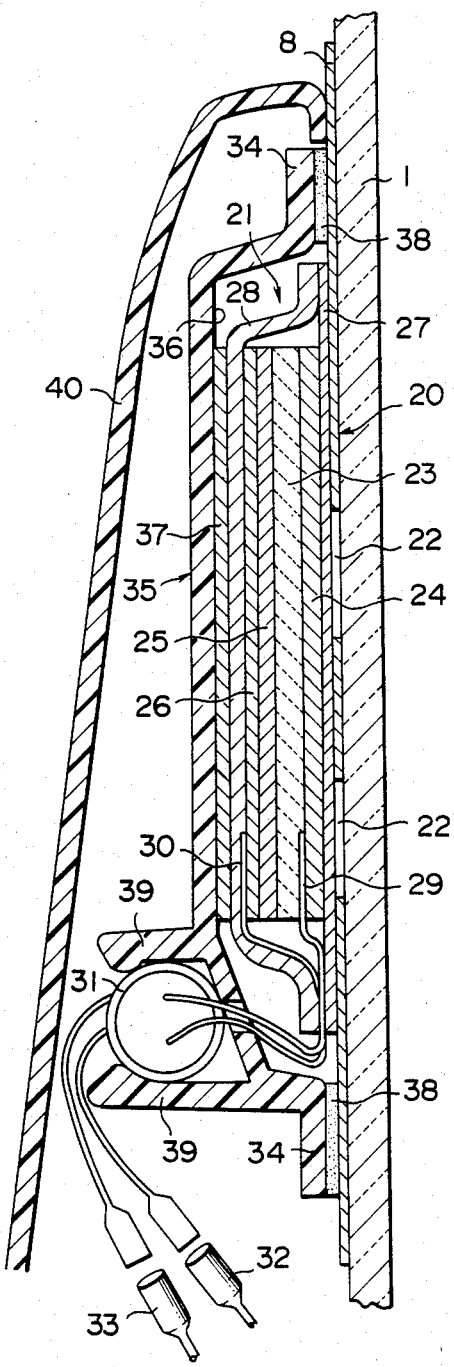
FIG. 5 is a sectional view illustrating the construction of a luminescent lamp usable in the present invention.

Referring to FIGS. 3 to 5, there is shown the marking display structure for a motor vehicle window according to an embodiment of the present invention, wherein marking display element 20 is provided on a lower portion of the inner surface of a rear quarter window glass membrane 1, and a luminescent lamp 21 is provided in facing relationship with the inner surface of the marking display element 20.

The marking display element 20 is of a pattern representing the type, model or the like of the motor vehicle. It may be formed in a punched-out fashion in part of a mask coating 8 applied onto the peripheral portion of the inner surface of the rear quarter window glass membrane 1. This pattern forms a light-permeable pattern 22.

The luminescent lamp 21 may comprise, for example, an Electro-Luminescent Lamp of Type LX or LT (tradename) available from Fukuda Kinzoku Hakufun Kogyo Co., Ltd., a Japanese manufacturer. The luminescent lamp, as shown in FIG. 5, consists of a light emitting layer or luminescent layer 23, a light-permeable electrode layer 24 laminated on the outer side of the light emitting layer 23, a dielectric layer 25 on the inner side of the light emitting layer 23, a rear electrode layer 26 on the inner side of the dielectric layer 25, and humidity-proof, transparent films 27, 28 containing all these layers in a humidity-tight manner. The light-permeable electrode layer 24 and the rear electrode layer 26 are each connected to the output terminals of a DC-AC converter, or an invertor 31 through leads 29, 30, and the input terminals of the invertor are in turn connected to terminals 32, 33 leading to the lighting harness.

The luminescent lamp 21 is bonded to a recessed portion 36 of a resin cover 35 by double-faced adhesive tape 37. A flange 34 provided around the periphery of the cover 35 is bonded to the inner surface of the rear quarter window glass membrane 1 by using a quantity of bonding agent 38 so that the light-permeable electrode layer 24 is placed in facing relationship with the rear quarter window glass membrane 1.

The resin cover 35 is provided with a support portion 39 formed integrally therewith to support the DC-AC invertor 31 and is hidden by a trim 40 from inside the window.

Since with this construction the luminescent lamp 21 is disposed inside the light-permeable pattern 22 of the marking display element 20, when one looks during day time at the rear quarter window glass 1 from outside the color of the luminescent lamp 21 is seen through the light-permeating pattern 22, so that he can recognize the marking through the window. At night, a switch (not shown) is turned on to convert a direct current supplied from a battery (not shown) into an alternating current by means of the DC-AC invertor 31 and the alternating current thus obtained is then supplied to the electrode layers 24, 26 of the luminescent lamp 21, thus causing the luminescent layer 23 to emit light. The light from the luminescent layer 23 passes through the light-permeating pattern 22 so as to make the marking on the window clearly recognizable to anyone looking at the rear quarter window. Any desired color can be chosen for the luminescent layer 23 such as green white, red, etc.

Figure 6:
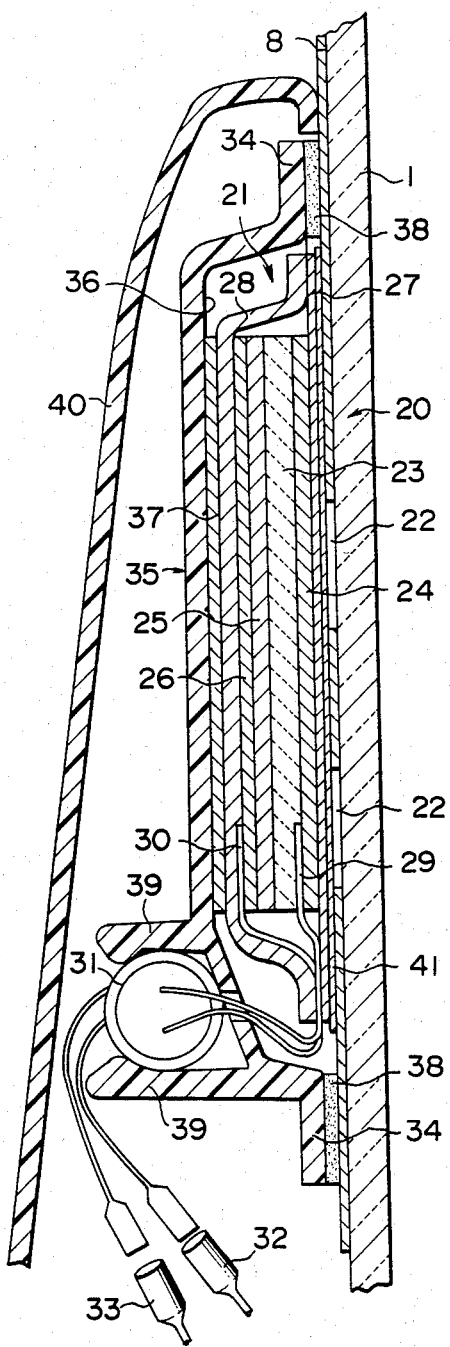
FIG. 6 is a sectional view showing the marking display structure for a motor vehicle window according to a second embodiment of the present invention.

Referring now to FIG. 6, there is shown a second embodiment of the present invention. Basically, the construction of the second embodiment is similar to that of the first embodiment except that a light-permeating colored film 41 is provided on the inner surface of the marking display element 20 in such a manner as to cover the light-permeating pattern 22, by means of vapor deposition, for example.

With the marking display structure according to the second embodiment, when viewed from outside the rear quarter window during day time, the marking display element 20 is viewed with the color of the film 41 through the light-permeating pattern with the surface color of the luminescent lamp 21 hidden, so that the marking is recognized with the color of the film 41. Thus, by using a metallic-colored film as the colored film 41, for example, it is possible to make the marking of the element 20 look gorgeous when viewed during day time. It is also possible, by using as the colored film 41 a film of the same color as that of the luminescence available from the lamp 21, for example, to make the marking of the element 20 appear no different between during day or night. In this way, it is possible to make the marking appear as desired, by suitably selecting the color for the film 41.

While in the above embodiments the marking display element 20 comprises the light-permeable pattern 22 punched out in a part of the mask coating film 8, it is not limited to this construction and may be formed of light-permeable and non-light-permeable films laminated together. The marking display element 20 need not necessarily be attached to the rear quarter window glass 1 but may be provided on the surface of the luminescent lamp 21. It is also possible to make the marking display element 20 integral with the luminescent lamp 21. In this case, the marking display element 20 may be made integral with the light-permeable electrode layer 24 and humidity-proof film 27 which are disposed closer to the rear quarter window glass membrane 1 than the light-emitting layer 23. While in the above embodiments the lamp 21 comprises an electro-luminescent lamp, it is not limited thereto but may take any other form of lamp as long as it is of a planar construction. Further, it is possible to use other support means for holding the DC-AC invertor 31. For example, the support 39 may be formed integrally with an interior trim 40 as shown in FIG. 7 or may be formed of a bracket 42 which may be spot-welded to the flange 4 of the rear pillar outer panel 3 as shown in FIG. 8. The DC-AC invertor 31 is not required when the luminescent lamp 21 is adapted to be energized by a DC power source. It is to be understood that this invention is applicable not only to a rear quarter window but also any other window such as the rear window or rear partition window of the motor vehicle.

While the present invention has been described and illustrated in conjunction with specific embodiments, it is to be understood that the present invention is by no means limited thereto and covers all changes and modifications which will become possible within the scope of the appended claims.

What is claimed is:

1. A marking display structure for a motor vehicle window, comprising:
   a light-permeable pattern provided on the inner surface of a glass membrane for a window of the motor vehicle;
   illuminating means for illuminating said pattern, said illuminating means comprising a luminescent lamp which comprises a light-permeable electrode layer, a rear electrode layer, and a luminescent layer interposed between said light-permeable electrode layer and said rear electrode, said light-permeable electrode being disposed in facing relationship with said pattern such that portions of said lamp are viewable through said pattern; and
   energizing means for energizing said lamp, said energizing means comprising a DC-AC converter, such that
   (a) when said lamp is not energized by said energizing means, said portions of said lamp are viewable with external illumination alone of said display structure, and
   (b) when said lamp is energized by said energizing means, said pattern is illuminated by said lamp, whereby said pattern is viewable without external illumination of said display structure.

2. A marking display structure as in claim 1, wherein said pattern comprises light-permeable portions corresponding to said pattern formed in a light-impermeable film disposed on the inner surface of said glass membrane.

3. A marking display structure as in claim 1, wherein said pattern is formed of light-permeable and light-impermeable films laminated together.

4. A marking display structure according to claim 1, further comprising a cover member having a recessed portion and a peripheral flange-like portion, and holding means provided on said cover member for holding said DC-AC converter, wherein said illuminating means is attached to the inner surface of said recessed portion, and said cover member is attached at said peripheral flange-like portion to the inner surface of said glass membrane, with said illuminating means being accommodated in said recessed portion.

5. A marking display structure according to claim 1, further comprising holding means provided on an interior trim of the motor vehicle for holding said DC-AC converter.

6. A marking display structure according to claim 1, further comprising holding means provided on a bracket attached to an opening flange of a rear pillar outer panel of the motor vehicle for holding said DC-AC converter.

7. A marking display structure according to claim 1, further comprising a light-permeable colored film interposed between said light-permeable pattern and said lamp.

8. A marking display structure for a motor vehicle, comprising:
   illuminating means for illuminating a pattern, comprising a luminescent lamp having a light-permeable electrode layer, a rear electrode layer, and a luminescent layer interposed between said light-permeable layer and said rear electrode layer;

a light-permeable pattern provided on the surface of said luminescent lamp such that portions of such lamp are viewable through said pattern; and energizing means for energizing said lamp, said energizing means comprising a DC-AC converter, such that
  (a) when said lamp is not energized by said energizing means, said portions of said lamp are viewable with external illumination alone of said display structure and
  (b) when said lamp is energized by said energizing means, said pattern is illuminated by said lamp, whereby said pattern is viewable without external illumination of said display structure.

9. A marking display structure according to claim 8, further comprising a light-permeable colored film interposed between said light-permeable pattern and said surface of said luminescent lamp.

10. A marking display structure according to claim 7, wherein said colored film is a metallic-colored film.

11. A marking display structure according to claim 9, wherein said colored film is a metallic-colored film.

12. A marking display structure according to claim 7, wherein said colored film is the same color as illumination from said lamp.

13. A marking display structure according to claim 9, wherein said colored film is the same color as illumination from said lamp.

* * * * *